US007430600B2

(12) United States Patent
Trabelsi et al.

(10) Patent No.: US 7,430,600 B2
(45) Date of Patent: Sep. 30, 2008

(54) METHOD AND DEVICE FOR MAKING A PORTAL IN A COMPUTER SYSTEM SECURE

(75) Inventors: Hatem Trabelsi, Chaville (FR); Philippe Dutrueux, Grenoble (FR)

(73) Assignee: BULL, S.A.S. (FR)

( * ) Notice: Subject to any disclaimer, the term of this patent is extended or adjusted under 35 U.S.C. 154(b) by 910 days.

(21) Appl. No.: 10/169,582

(22) PCT Filed: Nov. 9, 2001

(86) PCT No.: PCT/FR01/03502

§ 371 (c)(1),
(2), (4) Date: Jul. 5, 2002

(65) Prior Publication Data

US 2003/0005123 A1 Jan. 2, 2003

(30) Foreign Application Priority Data

Nov. 10, 2000 (FR) .................................. 00 14507

(51) Int. Cl.
*G06F 17/30* (2006.01)
*G06F 15/16* (2006.01)

(52) U.S. Cl. ....................... 709/225; 709/220; 709/228; 707/9; 707/200

(58) Field of Classification Search ................. 709/223, 709/220, 221, 222, 224, 228, 225, 227; 713/200, 713/201; 707/9, 200; 726/6
See application file for complete search history.

(56) References Cited

U.S. PATENT DOCUMENTS 5,758,068 A * 5/1998 Brandt et al. ................. 726/27
5,774,660 A * 6/1998 Brendel et al. .............. 709/201
5,774,668 A * 6/1998 Choquier et al. ............ 709/223
6,298,446 B1 * 10/2001 Schreiber et al. .............. 726/27
6,493,749 B2 * 12/2002 Paxhia et al. ................ 709/220
6,567,849 B2 * 5/2003 Ludovici et al. ............ 709/223
7,171,411 B1 * 1/2007 Lewis et al. .................... 707/9
2003/0005123 A1 * 1/2003 Trabelsi et al. .............. 709/225
2007/0027929 A1 * 2/2007 Whelan ...................... 707/200

FOREIGN PATENT DOCUMENTS

EP 0 848 338 A 6/1998

OTHER PUBLICATIONS

Coggins, M. "SiteMinder 3.0" View Source, One Line! 1999, XP002175150, Extract from the Internet: URL:http://developer.netscape.com:80/viewsource/coggins_siteminder/coggins_siteminder.html—Aug. 16, 2001—Entire document.

(Continued)

*Primary Examiner*—Khanh Dinh
(74) *Attorney, Agent, or Firm*—Miles & Stockbridge, P.C.; Eric G. King

(57) ABSTRACT

The present invention presents a device and a method for handling security in a computer system comprising an existing organizational directory. Upon reception of an access request from an entity to a server machine of the system, the device creates or searches in a security directory for security data attached to the entity, without modifying the data of the existing directory.

22 Claims, 4 Drawing Sheets

OTHER PUBLICATIONS

Patent Abstracts of Japan, vol. 1999, No. 12, Oct. 29, 1999 & JP 11 177629 A (Nippon Telegr & Amp; Teleph Corp. & LT; NTT& GT, Jul. 2, 1999, Abstract & Figs. 1, 2.

Rapoza, J "SiteMinder Widens Directory Access" EWEEK, On Line! Sep. 1, 1998, XP002175151, extract from internet of Aug. 16, 2001 URL:http://www.zdnet.com/products/stories/reviews/0,4161,347426.00.html—Entire Document.

Bull Deutschland: Evidian . . . On Line! Oct. 27, 2000, XP002175152, Extract from the Internet, URL:http://www.bull.de/news/0010/2c.html—extract Aug. 14, 2001 Par. 0007.

* cited by examiner

METHOD AND DEVICE FOR MAKING A PORTAL IN A COMPUTER SYSTEM SECURE

FIELD OF THE INVENTION

The present invention concerns a method and a device for making a portal in a computer system secure, using but not modifying an existing organizational directory.

PRIOR ART

The computer systems of entities such as businesses, universities, public administrations, etc., very often include a directory that defines physical persons, groups of people, organizational units or other elements belonging to this entity. The directory lists a designation of said persons, a location, a role within said entity and/or any other characteristics.

More and more, companies wish to make their computer systems secure, and particularly their employees' use of the Web or of a particular network of machines to access said system.

The current devices offered for making computer systems secure require the existing directory to be modified so that security data can be added to it. The installation of a security device in a computer system very often requires a complete and painstaking analysis of the existing directory as well as a redefinition of the users and their organization in said directory. The installation of the security device is costly in terms of both time and money.

Moreover, the modeling of the security influences the configuration of the computer system, and particularly the existing directory; reinforced security mechanisms for the directory itself must be added. The range of utilization of said directory by the users is consequently reduced.

One problem posed by the present invention relates to the modification of the existing directory of a computer system during the securing of said system.

One object of the present invention consists of handling the security of a computer system while maintaining the existing organizational directory of said system.

Another object of the present invention consists of installing a security device into a computer system automatically without affecting the components of the system, i.e., to offer a "plug & play" automatic installation solution.

SUMMARY OF THE INVENTION

In this context, the present invention offers a method for making a computer system comprising at least one client machine and at least one server machine secure, wherein an existing organizational directory lists an entity by means of a unique designation, characterized in that it consists of creating a security directory in which security data are stored and/or, upon reception of a request from an entity via a server machine, of searching in said security directory for the security data related to said request and said entity, using the unique designation of said entity found in the directory.

The present invention also concerns the system for implementing said method, applications of said method, and the program that implements said method.

PRESENTATION OF THE FIGURES

Other characteristics and advantages of the invention will become clear in light of the following description, given as an illustrative and non-limiting example of the present invention, in reference to the attached drawings in which.

DESCRIPTION OF AN EMBODIMENT OF THE INVENTION

The computer system can be a system whose environment is distributed or local.

Figure 1:
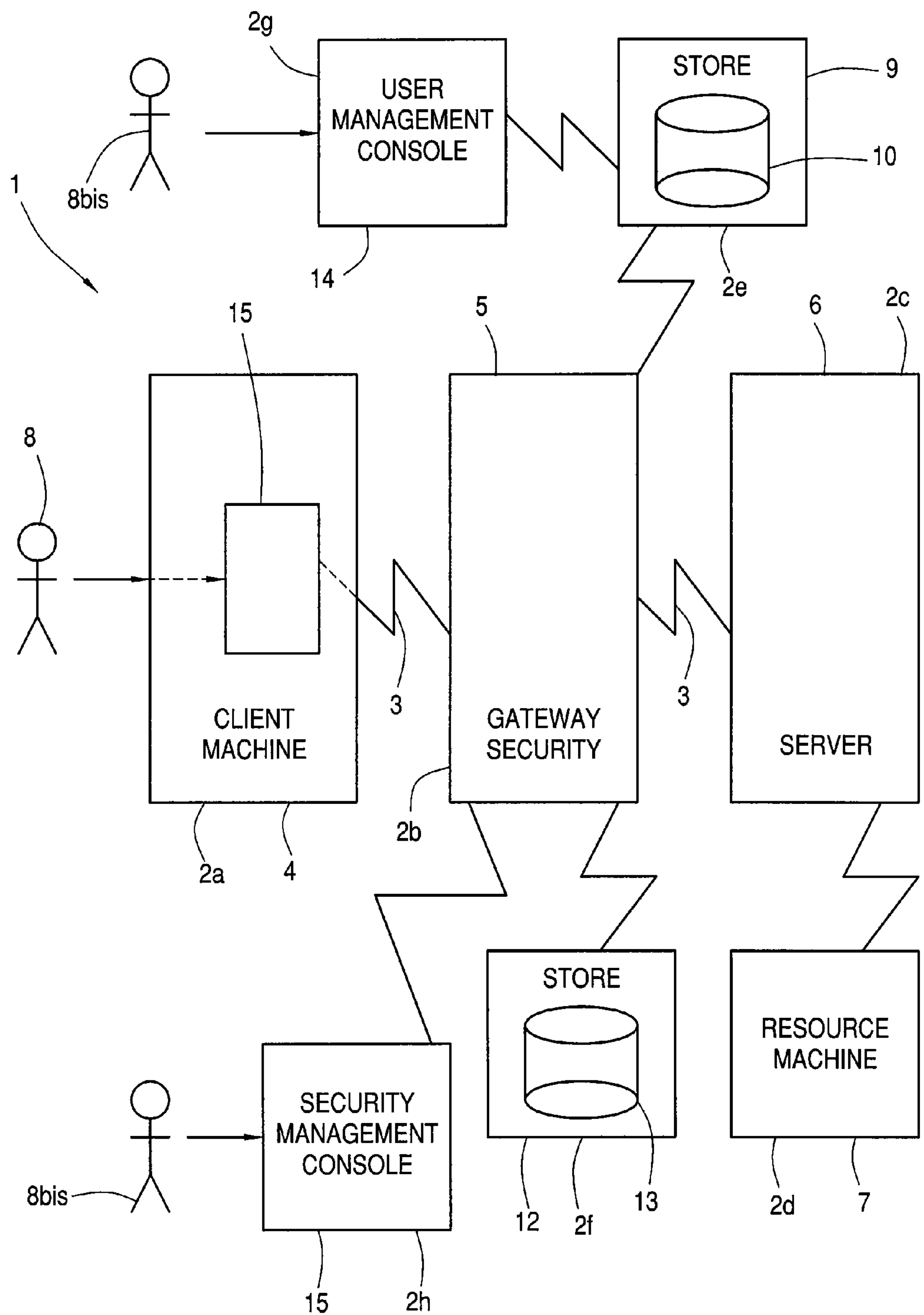
FIG. 1 is a schematic view of an embodiment of the system according to the invention.

As shown in the embodiment of the system according to the invention illustrated in FIG. 1, the system 1 is distributed and composed of machines 2*a*, 2*b*, 2*c*, 2*d*, 2*e*, 2*f*, 2*g*, 2*h* organized into one or more networks 3. A machine 2 is a very broad conceptual unit that includes both hardware and software. The machines can be very diverse, such as for example workstations, servers, routers, specialized machines, telephones or gateways between machines. Only the components of the machines 2 of the system 1 that are characteristic of the present invention will be described, the other components being known to one skilled in the art.

As shown in FIG. 1, in the present invention, the system 1 is a computer system comprising at least one machine 2*a* called a client machine 4, at least one security machine 2*b* called a security gateway 5, and at least one machine 2*c* called a server machine 6. The security gateway 5 is accessible via the client 4 and server 6 machines; it is placed between these two machines in order to intercept and process all the requests issuing from the client machines 4 and addressed to the server machines 6.

The system 1 comprises resource machines 2*d* called resources 7 that the client machines 4 wish to access at the request of calling entities 8. The resources 7 are accessible via the server machine 6 and are managed by said machine.

Figure 2:
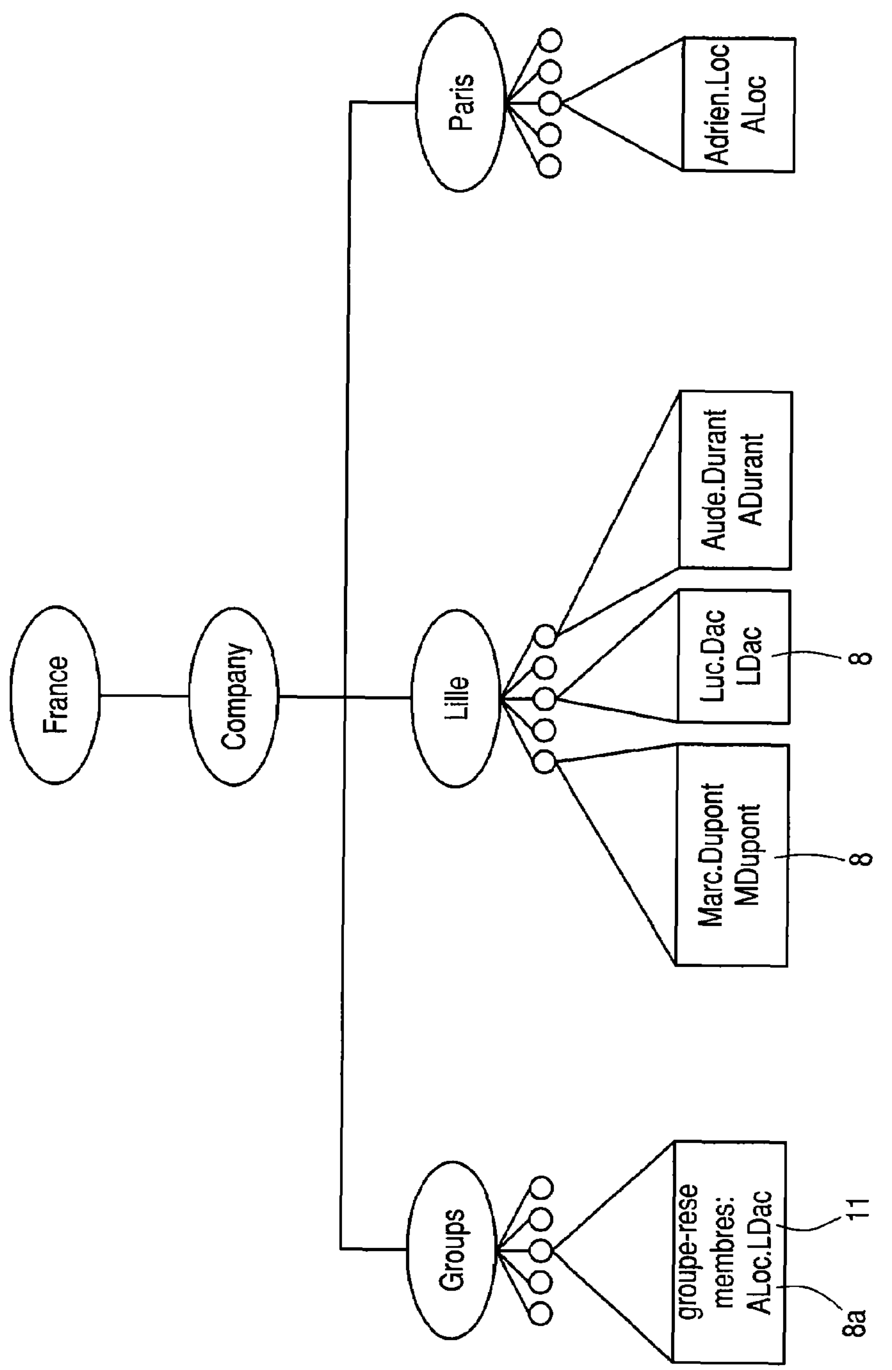
FIG. 2 represents an exemplary existing organizational directory of the system represented in FIG. 1.

The system 1 includes storage means 9 and means for handling accesses to an organizational directory 10 in which the entities 8 of the system 1 are listed and stored. In the embodiment illustrated in FIGS. 1 through 3, the storage means 9 comprise a disk in a machine 2*e*, the machine 2*e* being connected to the gateway 5. According to another embodiment, the storage means 9 comprise a memory in the security gateway 5. In the embodiment illustrated, the calling entities 8 are users (physical persons) of the system; the users 8 are arranged in the directory 10 based on their geographical location, as shown in FIG. 2. Thus, for example, the user Marc Dupont is located in Lille, in France.

The gateway 5 accesses the organizational directory 10 using the LDAP protocol (Lightweight Directory Access Protocol) or any equivalent protocol. A protocol equivalent to the LDAP protocol is a protocol for which the accessed directory has similar characteristics.

The characteristics of the LDAP protocol or an equivalent protocol are as follows:

- the data are stored in storage units;
- the data are organized so as to be accessible during a creation, a search, a modification or a deletion;
- a storage unit is identified in a unique way by means of an identifier or a name or the like.

In detail, for the example illustrated, the characteristics of a directory accessed using LDAP are as follows:

The data are organized hierarchically. "Branches" derive from a single "root" (France in FIG. 2). Each "node" can have either other branches, or "leaves."

The unit of storage is called an "LDAP entry" 11. The LDAP entry 11 is either a node or a leaf. In FIG. 2, an LDAP entry 11 is represented by a rectangle.

An LDAP entry is associated with a certain amount of information that is specific to it; this information is called the "attributes" of the entry. The directory contains an attribute identifying each user in a unique way: the unique identifier. The unique identifier corresponds, in the example illustrated, to the first letter of the first name joined to the last name of the user 8: MDupont for Marc Dupont.

An entry 11 is unambiguously identified by means of a unique name called the dn (distinguished name). The dn of Marc Dupont in FIG. 2 is as follows:

Dn=Marc.Dupont/Lille/France

The unique name depends on the organization of the directory. If the organization changes (the subsidiary Lille disappears), the unique name of the entry concerning, for example, Marc Dupont, changes:

Dn=Marc.Dupont/Paris/France. On the other hand, the unique identifier of Marc Dupont remains unchanged: MDupont.

The system 1 includes storage means 12 and means for handling access to a security directory 13. In the embodiment illustrated in FIGS. 1 through 3, the storage means 12 comprise a disk in a machine 2*f*, the machine 2*f* being connected to the gateway 5. According to another embodiment, the storage means 12 comprise a memory in the security gateway 5.

According to another embodiment, the storage means 12 correspond to the storage means 9. The security data are stored on the same physical medium as the existing data concerning the entities 8. The security data are logically separated from the existing data. For example, the security data are all located in a single branch attached to the existing directory. No matter what physical medium and logical form are used, the data are said to be stored in the security directory 13, it being understood that the security directory can take the form of a branch attached to the existing directory on the same physical medium.

The security directory 13 in the embodiment illustrated is accessed using LDAP.

Figure 3:
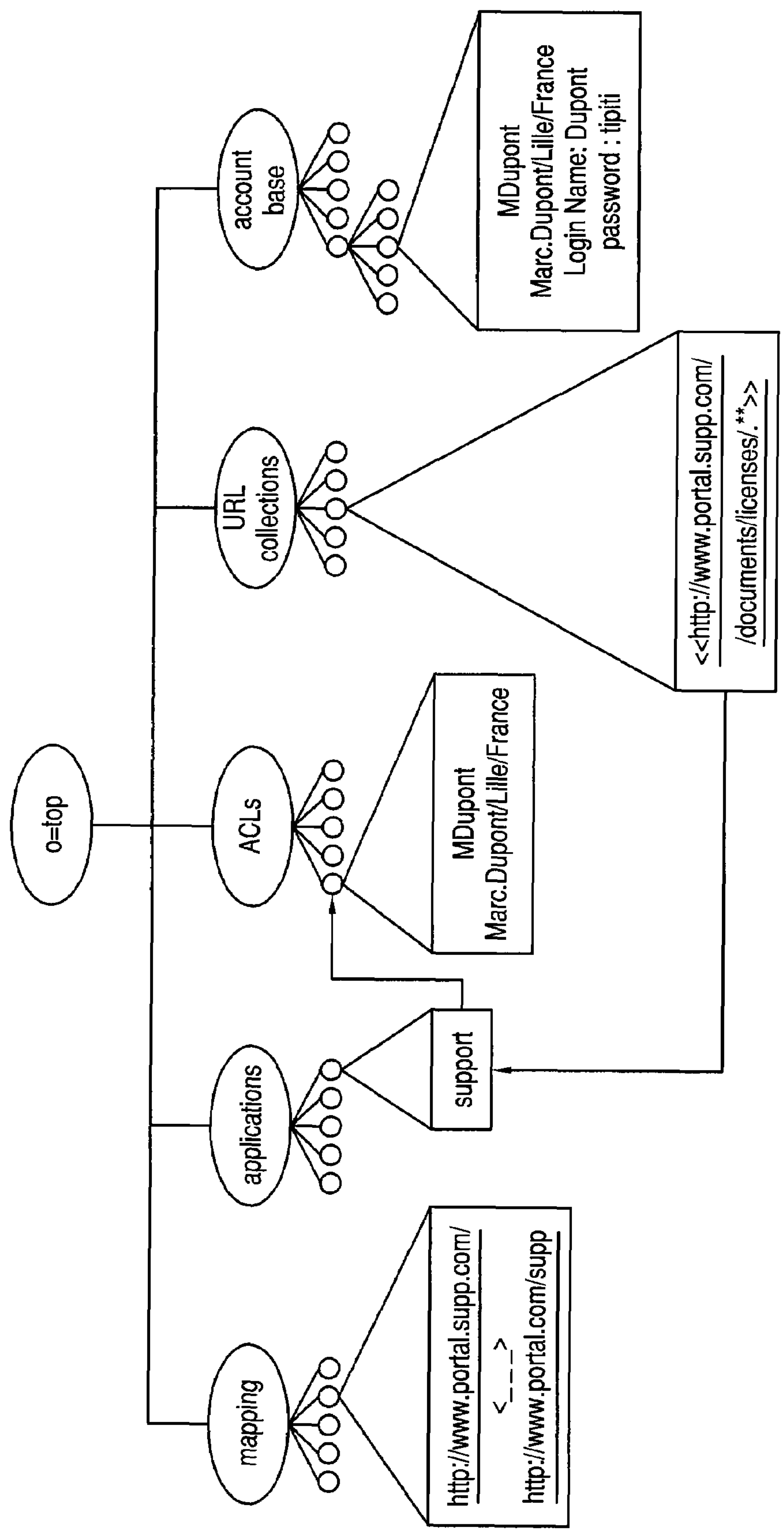
FIG. 3 is a first exemplary arrangement of security data in the system according to the present invention represented in FIG. 1.

In the embodiment illustrated in FIG. 3, the information collected in the security directory 13 is:

one or more pieces of information for mapping between addresses on the Web, called URLs (Uniform Resource Locators), requested by the user, and URLs protected by the security gateway 5; the purpose of the mapping information is to hide the real internal URLs of the server machines from the client machines. The adjectives internal and external qualify the position of a machine relative to the gateway 5. Upstream from the gateway 5, no security device is present and the machines are external (outside the security device). Downstream from the gateway 5, the machines 2 are protected by the gateway 5, which intercepts and handles the security of external requests coming from external machines; the components of the system are qualified as internal. For example, as shown in FIG. 3, the mapping information indicates that the requested URL "http://www.portal.com/supp" corresponds to the protected URL "http://www.portal.supp.com/". The address "http://www.portal.com/" is the URL of the security gateway 5; the requests from the user 8 are directed to the gateway 5, whereas the user thinks he is connected to the server "supp" of the support application. The URL of the server machine contains the URL of the gateway 5, but the user 8 is not aware of this. By typing the URL "http:// www.portal.com/supp", the user believes he is connecting directly to the server machine "supp" that handles the support application, whereas in fact, he is connecting to the gateway having the URL "http://www.portal.com/".

a URL collection or collections: in the example illustrated, the URL collections indicate, through appropriate link attributes, the existence of an access control list for the application whose URL is protected. In the example described, the URL collections are clearly defined: URLs in the same collection are characterized by a regular expression. For example (FIG. 3), all of the URLs characterized by the regular expression "http://www-.portal.supp.com/documents/licenses/*", in which "*" represents one or more characters of any type, are part of the same collection. The protected URL "http://www-.portal.supp.com/ documents/licenses/" is part of said collection. URLs in the same collection have the same access rights to applications. Again in the example described, the entry corresponding to the collection "http://www.portal.supp.com/documents/licenses/*" comprises a link attribute to the support application, the support application comprising a link attribute to the access control list for this application. there is an access control list for the support application.

an access control list or lists: the access control lists (ACLs in FIGS. 3 and 4) stored in the storage means 12 indicate access rights of users 8 to server machines 6. In the embodiment illustrated, the access control list comprises a list of identifiers and dn's of users 8 or dn's of groups.

An account base for applications: the accounts store identifiers and user dn's as well as login names and passwords specific to the users 8 for accessing the applications in question. One entry per application is created. In each application, there is an entry containing the necessary information in the form of a list of attributes.

and/or any other information required to implement security.

In the example illustrated in FIG. 2, users 8 having similar privileges are gathered into groups.

A privilege is a security attribute of a user 8 that makes it possible to control the latter's access to a server machine 6. For example (FIG. 2), a user such as Adrien Loc is assigned the privilege "group-resa", a privilege that authorizes him to access the reservation application.

The system 1 includes a management machine 2*b* called a user management console 14, which makes it possible to enter, modify, delete, and search for the users and the groups to which they belong, and a management machine 2*h* called a security management console 15, which makes it possible to enter, modify, delete, and search for the data in the security directory 13.

According to a particular embodiment of the system according to the invention, the machines 2 belong to the Web. The client machine 2*a* includes a piece of browser software 15 through which the user 8 sends his requests to a site on the Web. The entry point to a set of given sites is called a portal. The portal provides a page on the web on which the owner of the site organizes and presents the information on said site in a customized way. A page on the Web (commonly called a Web page in computer literature) is a electronic document such as, for example, a text file, an image, or a video into which special codes (the tags) have been inserted, which control the structure, the appearance, the dynamic behavior, etc., of the page in software for navigating on the Web (commonly called Web browsers in computer literature). A Web browser is a piece of software used to present a document to a user, and to keep track of the relationships established between this document and other documents by means of Web links.

The gateway 5 secures the portals of the sites of the server machines 6 by intercepting and processing the requests coming from the client machines 4.

The method according to the present invention proceeds in the following way in the computer system illustrated in FIGS. 1 through 4. It should be noted that the method can be used in any other system.

The first step consists of creating the security directory 13 in the computer system 1.

The mapping information, the information related to the collections of protected URLs and the access control lists (ACLs) are entered directly by an administrator user 8*a* from the security management console 15. The gateway 5 searches in the organizational directory 10 for the identifier and the dn of the user 8 in question, which are necessary for arranging the security data in the security directory.

In the example illustrated in FIG. 2, the administrator 8*a* enters from the security management console 15 the following data:

the mapping between the external URL "http://www.portal.com/supp" and the protected internal URL "http://www.portal.supp.com/" as well as the mapping between the external URL "<<http://www.portal.com/resa" and the protected internal URL "http://www.portal.resa.com/".

the URL collection characterized by the expression "http://www.portal.supp.comIdocuments/licenses*" is the one characterized by the expression "http://www.portal.resa.com/reservation/launch/". Each of these URL collections has a link attribute to an access control list.

an access control list for the support application and one for the reservation application.

When the user 8 wants to subscribe to a given application, he sends the server machine 6 that manages said application an account creation request. The security gateway 5 intercepts said account creation request for the application in question. The security gateway 5 transmits to the client machine 4 a page dedicated to the opening of an account for the application in question. The user enters the information requested on said page and sends the completed page back to the server machine 6 to which the user wants to connect. The security gateway 5 intercepts said response, extracts the information entered by the user 8 and adds it to the security directory 13. To do this, it begins by searching for the user 8 in the organizational directory 10, and more particularly for his identifier and his distinguished name (dn). It creates an LDAP entry 11 in the directory 13 corresponding to the application in the branch of account bases, and an entry in the branch of accounts created corresponding to the user 8. The entry 11 of the user 8 includes the following attributes:

the unique identifier of the user ("MDupont" in the example of FIG. 3);

the unique dn of the user (Marc.Dupont/Lille/France);

the login name (Dupont) and the password (tipiti) required to access the application in question.

The security directory 13 is created partly during its installation and partly during the running of the system 1.

The security gateway 5 intercepts a request from a user 8 for access to a protected URL. The gateway 5 verifies that the user 8 has been authenticated using the method described in the patent application entitled "METHOD AND DEVICE FOR HANDLING AN AUTHENTICATION IN A COMMUNICATION USING HTTP," filed by the present Applicant on the same day as the present application.

If the user 8 has not yet been authenticated, the security gateway 5 requests authorization of the user 8 from the client machine 2*a*. The client machine 2*a* presents an authentication window to the user 8. The user fills in said window, specifically indicating his identifier and the information required to form a distinguished name. The information entered is sent back to the gateway 5.

When the user has been authenticated, the security gateway 5 searches in the organizational directory 10 for the authenticated user 8, and more particularly for his unique identifier and his distinguished name.

Requests for access to a URL indicate, depending on the client machines 4, the identifier or the dn of the user 8. The use of both designations by the present device makes it possible to process all of the requests coming from client machines.

The gateway 5 verifies whether the user 8 is part of a group in the organizational directory. The gateway 5 extracts from the organizational directory 10 the unique identifier, the distinguished name of the user 8 and the name of one or more groups to which the user 8 may belong, called the groups of the user 8.

For example, if Adrien Loc wants to connect to the reservation application, the gateway 5 extracts from the directory 10 the identifier ALoc, the dn Adrien.Loc/Paris/France, and the group group-resa.

The gateway 5 searches in the security directory 13 for the mapping information attached to the URL requested by the user.

If the mapping information does not exist in the directory 13, the gateway 5 returns an error to the client machine 4: the URL does not exist.

If the mapping information is present in the directory 13, the gateway 5 retrieves the corresponding protected internal URL.

The gateway 5 searches in the security directory 13 to see whether the internal URL retrieved is part of a collection of URLs protected by an access control list.

If this is not the case, the machine 2*b* considers access to the URL to be open and transmits the request for access to the internal URL retrieved.

If the internal URL retrieved is part of a collection of protected URLs, the gateway 5 consults the link attribute to an access control list. The gateway verifies that the user 8, or one or more of the user's groups, belongs to the access control list for the application in question. As seen above, the gateway has retrieved from the organizational directory 10 the identifier and the dn of the user 8 as well as the dn of the user's group or groups. The gateway searches for the user's identifier and dn or for the dn of the user's group or his various groups, if any exist, in the access control list of the application in question.

Figure 4:
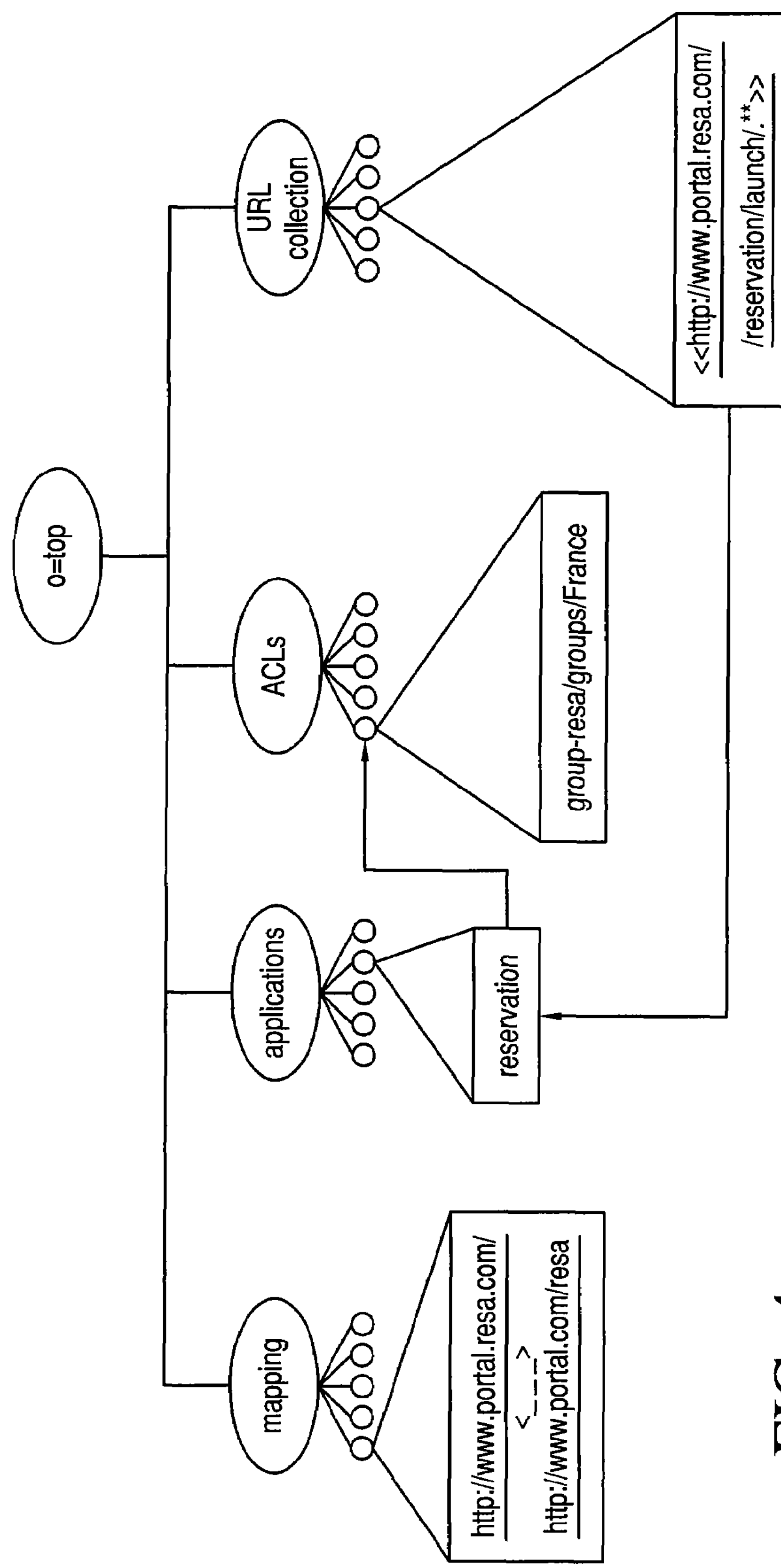
FIG. 4 is a second exemplary arrangement of security data in the system according to the present invention represented in FIG. 1.

In the example of FIGS. 2 through 4, the gateway retrieves from the directory 13 of FIG. 3 the user Marc Dupont and the group group-resa of the user Adrien Loc, if Marc or Adrien have sent requests for access to the support and reservation applications, respectively, from a client machine 4. The gateway 5 deduces that Marc has the right to access the support application, and that Adrien has the right to access the reservation application, subject to an account for said applications.

If the search is unsuccessful, i.e. if neither the identifier nor the dn of the user, nor the dn of a group of the user, has been found in the access control list, the gateway 5 deduces that access is denied: an access denied response is immediately transmitted to the user 8 on the machine 2*a*.

If the gateway finds the user's identifier or dn, or the dn of the group or the various groups of the user 8 in the access control list, the gateway 5 proceeds with the processing of the request by analyzing the account of the user 8, or of the group to which he belongs, for the application in question. The gateway 5 searches in the account base for the branch corresponding to the application whose URL is protected; if there is an account for this application, the gateway 5 searches in said account for the unique identifier or the distinguished name of the user retrieved from the organizational directory.

If the machine 2*b* finds the unique identifier or the distinguished name in the branch of the application in question, it extracts from the security directory 13 the login name and the password required to access said application.

If the machine does not find any direct account for the user, it searches for an account listed under the name of a group of the user. If such an account is found, the machine extracts from the security directory 13 the login name and password required to access said application (in the name of the group).

In the example of FIG. 3, when Marc Dupont requests access to the support application, the gateway 5 extracts from the directory 13 the login name Dupont and the password Tipiti. In the example of FIG. 4, no account has been provided for the group group-resa or for Adrien Loc.

The gateway transmits the login name and the password of the user 8 in question to the server machine 6 whose URL is protected, followed by the request from said user. The server machine 6 receives the user's login name and password and authorizes his access. The gateway 5 performs a "Single Sign On", i.e. a single connection procedure for a set of applications; the user is authenticated only once; his login names and passwords are not required with each access to an application. The gateway stores the login names and passwords per application for the user 8.

The present invention therefore offers a device and a method for handling security in a computer system 1 comprising an existing organizational directory 10, making it possible, upon reception of a request from an entity 8 for access to a server machine 6 of the system 1, to create or search in a security directory 13 for security data attached to said entity 8 without having to modify the existing data in the directory 10.

Hence, the present invention concerns a method for securing a system 1 comprising at least one client machine 4 and at least one server machine 6, wherein an existing organizational directory 10 lists an entity 8 by means of a unique designation, characterized in that it consists of creating a security directory 13 in which security data are stored and/or, upon reception of a request from an entity via a server machine 6, of searching in said security directory 13 for the security data related to said request and said entity 8, using the unique designation of said entity 8 found in the directory 10.

The method uses as the unique designation an identifier and a distinguished name.

The method consists of intercepting, by means of the gateway 5, all of the requests addressed to the server machine by the client machine, by sending requests to a URL of the server machine that contains the URL of the gateway.

The security data comprise:

at least one piece of information for mapping between a URL requested by the entity 8 and a protected URL, and/or at least one URL collection, and/or at least one access control list, and/or at least one account for an application.

The method consists of searching in the security directory 13 for mapping information for the request in question, of returning an error to the client machine 4 if the mapping information does not exist, and of processing the request using the protected URL or performing searches for other security data if the mapping information exists.

The method consists of searching in the security directory 13 to see if there is an access control list attached to the application involved in this request, of considering access to the application to be open if no access control list is found, of searching for the entity 4 or for a group to which it belongs in the list found and denying access to the application if the entity and/or the group is absent from the list, and of processing the request or performing other searches for security data if the entity and/or the group is present in the list found.

The method consists of searching in the security directory 13 for an account for the application involved in said request in the name of the entity 4 or of a group to which it belongs, of authorizing access to said application and considering it to be anonymous if no account is found, and of processing the request with the security data of the account found or performing other searches for security data if an account is found.

The present invention also concerns a device for securing a system 1 comprising at least one client machine 4 and at least one server machine 6, wherein an existing organizational directory 10 lists an entity 8 by means of a unique designation, characterized in that it comprises a machine 2 and a security directory 13 in storage means 12, the machine 2 making it possible to create, modify, delete or search in the security directory 13 for security data, using as the security data attached to the entity 8 the unique designation found in the directory 10.

The machine 2 is a security gateway 5 placed between the client machine 4 and the server machine 6 that intercepts all of the requests addressed to the server machine by the client machine, the client machine sending requests to a URL of the server machine that contains the URL of the gateway.

The device includes a security management console 15 for entering, modifying, deleting, or searching for all or some of the security data in the directory 13.

The present invention applies to the securing of a portal, the machine 2*a* including a piece of browser software through which the entity 8 sends requests to said portal. The present invention also applies to a single sign-on procedure.

The present invention relates to a program integrated into a machine 2 of a computer system 1 implementing the method according to the present invention.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A method for making secure a computer system having at least one client machine, at least one server machine, and an existing organizational directory, the method comprising:

listing entities in the organizational directory using unique designations, creating a security directory in which modifiable security data are stored, the security data including information for mapping and further comprising at least one access control list for an application, upon receipt of a request from an entity, searching in said security directory using the unique designation of said entity in the directory to obtain security data related to the request from the entity, wherein the searching in said security directory further comprises searching in the security directory for an access control list related to the application involved in the request, considering access to said application to be open if no access control list is found, searching for an entity or for a group to which the entity belongs if the access control list is found, denying access to the application if the entity and/or the group is absent from the access control list, and based on the security data, processing the request or performing other searches for security data if the entity and/or the group is present in the found list.

2. The method according to claim 1, further comprising:

using as the unique designation an identifier and a distinguished name.

3. The method according to claim 1, further comprising:

intercepting all requests addressed to the server machine from the client machine using a gateway, and sending requests to a URL of the server machine that contains the URL of the gateway.

4. The method according to claim 2, further comprising:

intercepting all requests addressed to the server machine from the client machine using a gateway, and sending requests to a URL of the server machine that contains the URL of the gateway.

5. The method according to claim 1, wherein the security data comprise at least one piece of information for mapping between a URL requested by the entity and a protected URL.

6. The method according to claim 1, wherein the security data comprise at least one URL collection.

7. The method according to claim 1, wherein the security data comprise at least one account for an application.

8. The method according to claim 1, wherein the security data comprise at least one piece of information for mapping between a URL requested by an entity and a protected URL and further including at least one URL collection.

9. The method according to claim 1, wherein the information for mapping includes at least one piece of information for mapping between a URL requested by, the entity and a protected URL, and wherein the security data further comprise at least one URL collection, at least one account for an application.

10. The method according to claim 8, further comprising:

searching in the security directory for mapping information for the request by the entity, returning an error to the client machine if the mapping information does not exist, and processing the request using the protected URL or performing searches for other security data if the mapping information exists.

11. The method according to claim 9, further comprising:

searching in the security directory for an account for the application involved in said request in the name of the entity or of a group to which the entity belongs, authorizing access to said application, considering the request to be anonymous if no account is found, and processing the request with the security data if the account is found.

12. The method according to claim 10, further comprising:

searching in the security directory for an account for the application involved in said request in the name of the entity or of a group to which the entity belongs, authorizing access to said application, considering the request to be anonymous if no account is found, and processing the request with the security data if the account is found.

13. The method according to claim 1, further comprising:

searching in the security directory for an account for the application involved in said request in the name of the entity or of a group to which the entity belongs, authorizing access to said application, considering the request to be anonymous if no account is found, and processing the request with the security data if the account is found.

14. A security device for making a computer system secure, wherein the computer system includes at least one client machine and at least one server machine, wherein an existing organizational directory in the computer system lists an entity by means of a unique designation, the security device comprising:

a gateway interconnected between the server machine and client machine; and a memory connected to the gateway, said memory having a security directory and being configured to create, modify, delete, or search, based on receipt of a request from an entity, in the security directory for modifiable security data, the modifiable security data attached to the entity having the unique designation in the organizational directory, the security data including information for mapping and further comprising at least one access control list for an application, and the security data being utilized to process the request, wherein the memory is further configured to search in the security directory for an access control list related to the application involved in the request, consider access to said application to be open if no access control list is found, search for an entity or for a group to which the entity belongs if the access control list is found, deny access to the application if the entity and/or the group is absent from the access control list, and process the request or perform other searches for security data if the entity and/or the group is present in the found list.

15. The security device according to claim 14, wherein the gateway is interconnected between the client machine and the server machine and is configured to intercept all requests addressed to the server machine by the client machine, the client machine sending requests to a URL of the server machine that contains the URL of the gateway.

16. The security device according to claim 14, further including:

a security management console connected to the gateway for entering, modifying, deleting, or searching for all or some of the security data in the security directory.

17. The security device according to claim 15, further including:

a security management console connected to the gateway for entering, modifying, deleting, or searching for all or some of the security data in the security directory.

18. The method for making secure a computer system according to claim 1, wherein said step of searching, upon receipt of the request from the entity, further comprises receiving said request using a browser.

19. The method for making secure a computer system according to claim 1, further comprising:

controlling access using a single sign-on procedure.

20. A computer-readable storage medium encoded with a sequence of programmed instructions that, when executed by a computer, cause the computer to perform a method for making a computer system secure, the computer system having at least one client computer, at least one server computer, and an existing organizational directory, the method comprising:

listing entities in the organizational directory using unique designations, creating a security directory in which modifiable security data are stored, the security data including information for mapping and further comprising at least one access control list for an application, upon receipt of a request from an entity, searching in said security directory using the unique designation of said entity in the directory to obtain security data related to the request from the entity, wherein the searching in said security directory further comprises searching in the security directory for an control list related to the application involved in the request, considering access to said application to be open if no access control list is found, searching for an entity or for a group to which the entity belongs if the access control list is found, denying access to the application if the entity and/or the group is absent from the access control list, and based on the security data, processing the request or performing other searches for security data if the entity and/or the group is present in the found list.

21. The computer-readable storage medium of claim 20, further comprising:

using as the unique designation an identifier and a distinguished name.

22. The computer-readable storage medium of claim 20, further comprising:

intercepting all requests addressed to the server machine from the client machine using a gateway, and sending requests to a URL of the server machine that contains the URL of the gateway.

* * * * *

UNITED STATES PATENT AND TRADEMARK OFFICE

CERTIFICATE OF CORRECTION

PATENT NO. : 7,430,600 B2
APPLICATION NO. : 10/169582
DATED : September 30, 2008
INVENTOR(S) : Hatem Trabelsi and Philippe Dutrueux It is certified that error appears in the above-identified patent and that said Letters Patent is hereby corrected as shown below:

Column 11 – Line 3 – Replace “a computer, cause the computer” with “a machine, cause the machine”.

Column 11 – Line 5 – Replace “at least one client computer, at least one server computer” with “at least one client machine, at least one server machine”.

Column 11 – Line 19 – Insert “access” before “control”.

Signed and Sealed this

Seventeenth Day of February, 2009

JOHN DOLL
*Acting Director of the United States Patent and Trademark Office*